No. 692,872. Patented Feb. 11, 1902.
H. LEMP.
VEHICLE BRAKE.
(Application filed July 30, 1900.)
(No Model.) 2 Sheets—Sheet 1.
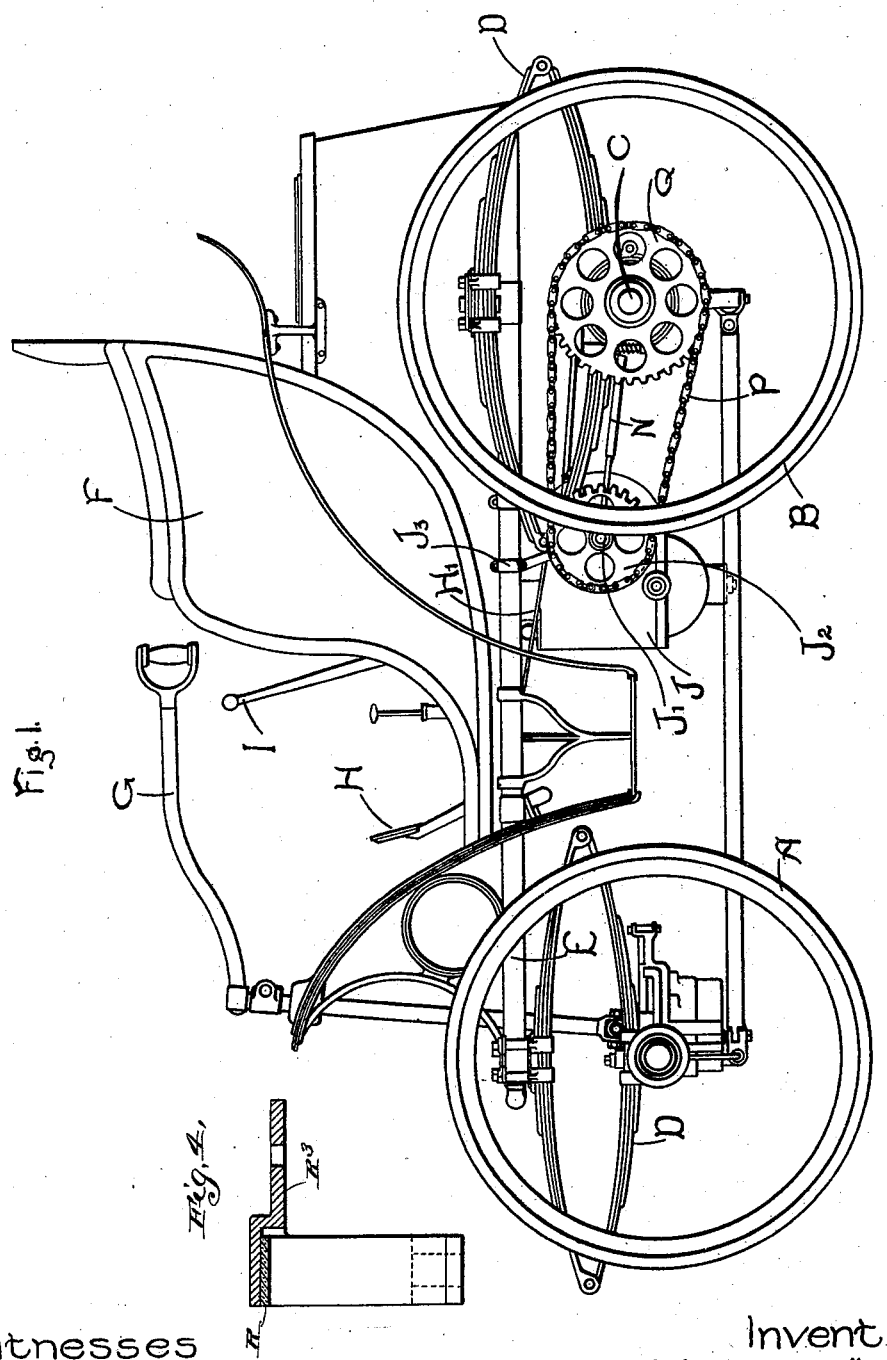
Witnesses
Inventor
Hermann Lemp
by Albert G. Davis
Atty.

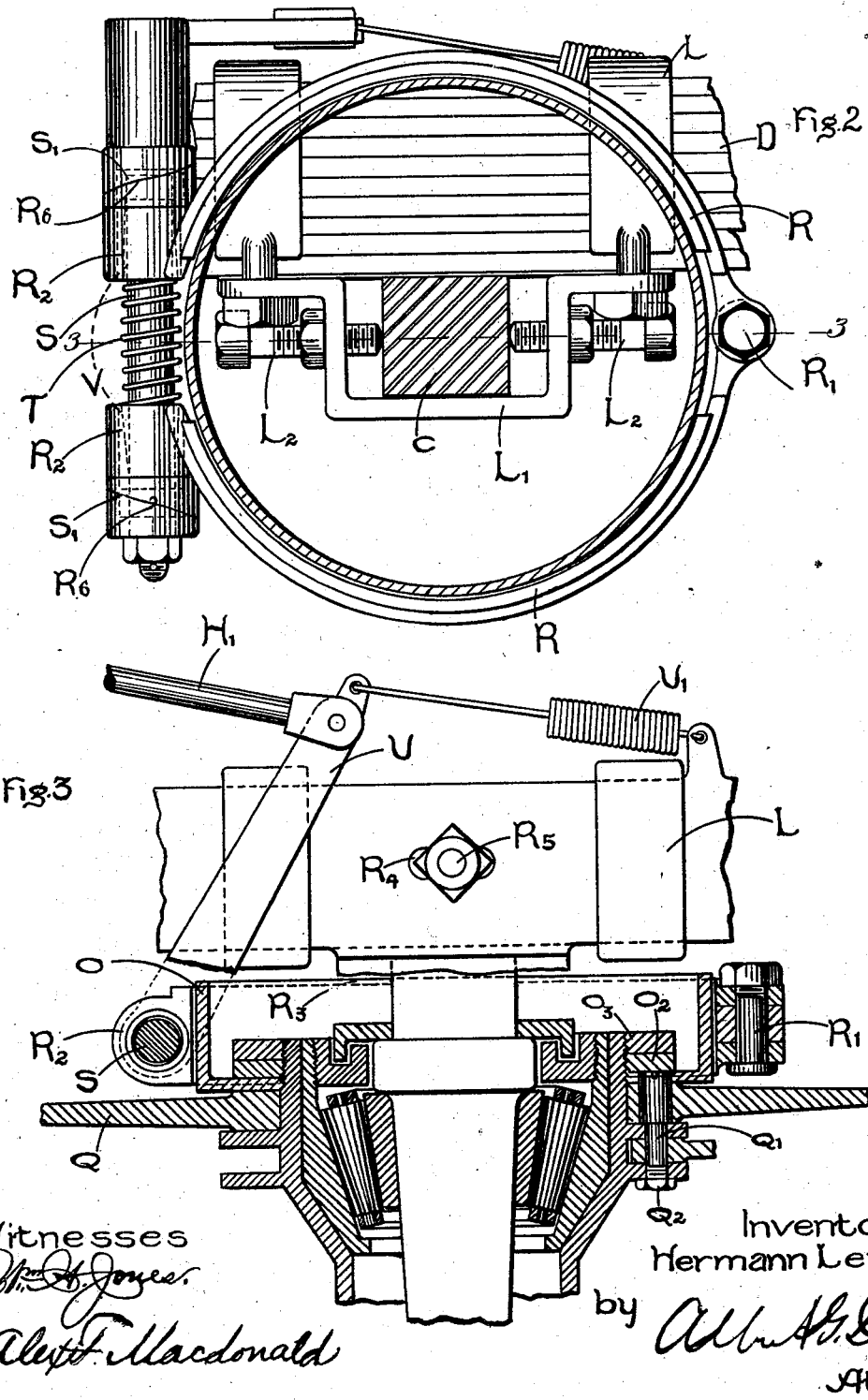

UNITED STATES PATENT OFFICE.

HERMANN LEMP, OF LYNN, MASSACHUSETTS, ASSIGNOR TO ELIHU THOMSON, OF SWAMPSCOTT, MASSACHUSETTS.

VEHICLE-BRAKE.

SPECIFICATION forming part of Letters Patent No. 692,872, dated February 11, 1902.

Original application filed March 27, 1900, Serial No. 10,385. Divided and this application filed July 30, 1900. Serial No. 25,235. (No model.)

*To all whom it may concern:*

Be it known that I, HERMANN LEMP, a citizen of the United States, residing at Lynn, county of Essex, State of Massachusetts, have invented certain new and useful Improvements in Vehicle-Brakes, (Case No. 1,718,) of which the following is a specification.

The present application is a division of my application, Serial No. 10,385, filed March 27, 1900, entitled "Self-propelled vehicles," and is filed in accordance with the requirements of the United States Patent Office.

The object of my invention is to provide a simple and reliable braking mechanism for vehicles, and is more particularly adapted for use in connection with vehicles which are self-propelled, although it can be used equally well with other types of vehicles.

In the accompanying drawings, which illustrate an embodiment of my invention, Figure 1 is a side elevation of a vehicle. Fig. 2 is a sectional view of the brake-disk, showing parts of the brake in elevation. Fig. 3 is a view, partially in section and partially in plan, of the axle and brake, the section being taken on line 3 3 of Fig. 2; and Fig. 4 is a sectional view showing the support for the brake-band.

Referring to Fig. 1, A represents the steering-wheels, which are mounted on short axles after the manner of the well-known double-axle suspension, and B represents the driving-wheels, mounted on a stationary rear axle C. Located above the wheel-axles and supported by four full elliptic springs D is the frame E, composed of tubing for the body F. The body may be of any desired shape and construction, and, mounted either on the body or frame thereof are supports for the steering-handle G, the foot-brake lever H, and the control-lever I. Carried by the frame E is the engine J or other motive-power agent. The engine is provided with a shaft J', which carries a sprocket $J^2$. This sprocket is geared to the sprocket Q, which is mounted on the rear wheel, by a chain P. The driving-shaft J' is partially supported by hangers $J^3$, which are carried by opposite sides of the vehicle-frame.

Referring more particularly to Figs. 2 and 3, the hub of the driving-wheel is enlarged, and mounted thereon is a sprocket Q, which is retained in place by the bolt Q' and the nut $Q^2$. Mounted on the hub in addition to the above and concentric with the axles is a cup-shaped or cylindrical casting O, which is secured in place by the bolt Q' and the nut $O^2$, a check-nut $O^3$ serving to hold the nut $O^2$ in place. The periphery of this casting is turned off true, and mounted for engaging therewith is a band-brake R. The band is made up of two separately-movable parts pivotally secured at one end by the transverse bolt R'. The upper half of the band is provided with the extension $R^3$, by which the entire band is supported. This extension is held in place by the inverted-U-shaped holders L, which also hold the leaves of the body-supporting elliptic spring. The extension is slotted at $R^4$, and passing downward through this slot is a clamping-bolt $R^5$. By loosening the nut thereon and also relieving the tension on the spring-holders L the brake-band may be centered or adjusted around the cup-shaped casting O, after which the parts may be readily secured in place. Each part of the band terminates in a head $R^2$, having a cam-surface $R^6$, the cam-surfaces on the two ends being oppositely disposed. The heads are bored centrally, and passing through the holes is a shaft S, which is provided with cams S', rigidly secured thereto and arranged to engage with the cam-surfaces on the head. The holes in the head are slightly tapered, as indicated by the dotted lines V, so that the brake-band will not be bound in place by the shaft when the cams are returned to their normal position by the action of the springs or other means.

Located between the heads and surrounding the shaft is a coiled compression-spring T for separating the parts of the brake-band, and thereby releasing the brake. Secured to the upper end of the shaft S is a lever U for actuating the brake. This lever is connected by a rod H' with the foot-lever H, Fig. 1, and is returned to its normal or inactive position by the extension-spring U', the latter being secured to an ear formed on the extension $R^3$. The foot-lever H is pivotally supported in a suitable hanger carried by the frame E, and when the rod H' is placed under tension it swings the lever U toward the front of the vehicle, and in so doing the cams S' on the the shaft S engaging with the cam-surfaces R⁶ on the band draws the ends of the band together and applies the brake. When the pressure on the foot-lever H is relieved, the springs U' and T will cause the brake to release. With this construction a very powerful braking effect is obtained with the expenditure of a small amount of energy. Moreover, the parts are simple to construct and readily replaced when worn.

What I claim as new, and desire to secure by Letters Patent of the United States, is—

1. In combination, a rotary cylindrical member forming a part of a brake mechanism, a second member arranged to engage with the first, a fixed support for the second member, a cam on said second member, a second cam arranged to engage with first, and means for actuating one of the cams.

2. In combination, a cylinder, a band arranged to make frictional engagement therewith, cams on opposite ends of the band and a rotary cam which is mounted on a shaft and is arranged to operatively engage with the cams on the band and move the latter into frictional engagement with the cylinder.

3. In combination, a revolving brake-cylinder, a strap arranged to make frictional engagement therewith, pieces having cam-surfaces secured to opposite ends of the strap, a shaft extending through said pieces and provided with two cams engaging with the cam-surfaces, and a spring which normally tends to separate the ends of the strap.

4. In combination, a cup-shaped brake member secured to the hub of a wheel, a band arranged for frictional engagement therewith, pieces on opposite ends of the band which are provided with cam-faces and slightly-tapered holes, a shaft extending through said holes, cams actuated by the shaft for forcing the strap against the cup-shaped brake member, and a means for rotating the shaft.

5. In combination, a wheel having an enlarged hub, a sprocket mounted on said hub, a bolt and friction-nut for retaining the sprocket in place, a cup-shaped brake member which is also mounted on the hub and is secured in place by said bolt and friction-nut.

6. In a vehicle, the combination of supporting-springs, a revolving element for a brake, a two-part strap mounted for engagement therewith, an extension on one part of the strap for supporting it, means for clamping the vehicle-springs and the extension, and means whereby the relative positions of the parts may be adjusted.

In witness whereof I have set my hand this 26th day of July, 1900.

HERMANN LEMP.

Witnesses:
 DUGALD MCKILLOP,
 JOHN MCMANUS.